(12) United States Patent
Islam et al.

(10) Patent No.: US 10,701,145 B1
(45) Date of Patent: Jun. 30, 2020

(54) DATA OUTPUT USING MESSAGE REQUESTS TO A MESSAGING SERVICE

(71) Applicant: Amazon Technologies, Inc., Seattle, WA (US)

(72) Inventors: Zakiul Islam, Vancouver (CA); Jesse Marcus Dougherty, West Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 15/264,181

(22) Filed: Sep. 13, 2016

(51) Int. Cl.
*G06F 15/16* (2006.01)
*H04L 29/08* (2006.01)
*H04L 12/58* (2006.01)
*H04L 12/24* (2006.01)

(52) U.S. Cl.
CPC ........ *H04L 67/1095* (2013.01); *H04L 41/046* (2013.01); *H04L 51/20* (2013.01)

(58) Field of Classification Search
USPC ........................................................ 709/204
See application file for complete search history.

(56) References Cited

U.S. PATENT DOCUMENTS

| 8,972,637 | B1* | 3/2015 | Hushon, Jr. | G06F 13/42 710/15 |
| 2007/0123253 | A1* | 5/2007 | Simongini | H04L 67/16 455/433 |
| 2013/0036427 | A1* | 2/2013 | Chen | G06F 9/546 719/312 |

* cited by examiner

*Primary Examiner* — Alan S Chou
(74) *Attorney, Agent, or Firm* — Thorpe North & Western, LLP.

(57) ABSTRACT

Technology is described for generating data output using message requests to a message queue. A plurality of message requests that are sent to the message queue may be detected. The message queue may be operated by a messaging service executing in a service provider environment. Message attribute information for the plurality of message requests may be identified. The plurality of message requests and corresponding message attribute information may be published as a data output. The data output may be processed by the service provider environment. Access to the data output may be provided for consumption of the message attribute information in the data output.

20 Claims, 10 Drawing Sheets

Step 1:

First component sends message A to message queue

Step 2:

Second component retrieves message A from message queue

Step 3:

Second component processes message A and deletes message A from message queue

DATA OUTPUT USING MESSAGE REQUESTS TO A MESSAGING SERVICE

BACKGROUND

Customers may execute distributed applications in a service provider environment. A distributed application (e.g., a web service application) may include various application components that are stored across multiple servers in the service provider environment. The application components may interact with each other to achieve a common goal associated with the distributed application. For example, the application components may communicate with each other and/or coordinate their actions by passing messages between the application components. As an example, an application component in the distributed application may generate a message for consumption by another application component in the distributed application.

In one example, the service provider environment may operate a messaging service that maintains a message queue. The message queue may be a repository that stores and communicates messages for the application components of the distributed application. For example, the message queue may store messages that are waiting to be processed by other application components. Rather than the application components directly sending messages to each other, the messaging service can function as a broker that provides a software and/or hardware infrastructure to support the sending and receiving of messages between the application components.

The messaging service may provide a reliable, fail-safe and scalable hosted message queue, and the implementation of the message queue may result in various advantages for the distributed application. For example, the message queue may be redundantly stored across multiple geographic regions in the service provider environment to increase robustness. The message queue may provide message storage when destination application components are busy or unavailable. In addition, the message queue may enable multiple application components to simultaneously send and/or receive messages.

DETAILED DESCRIPTION

Figure 1:
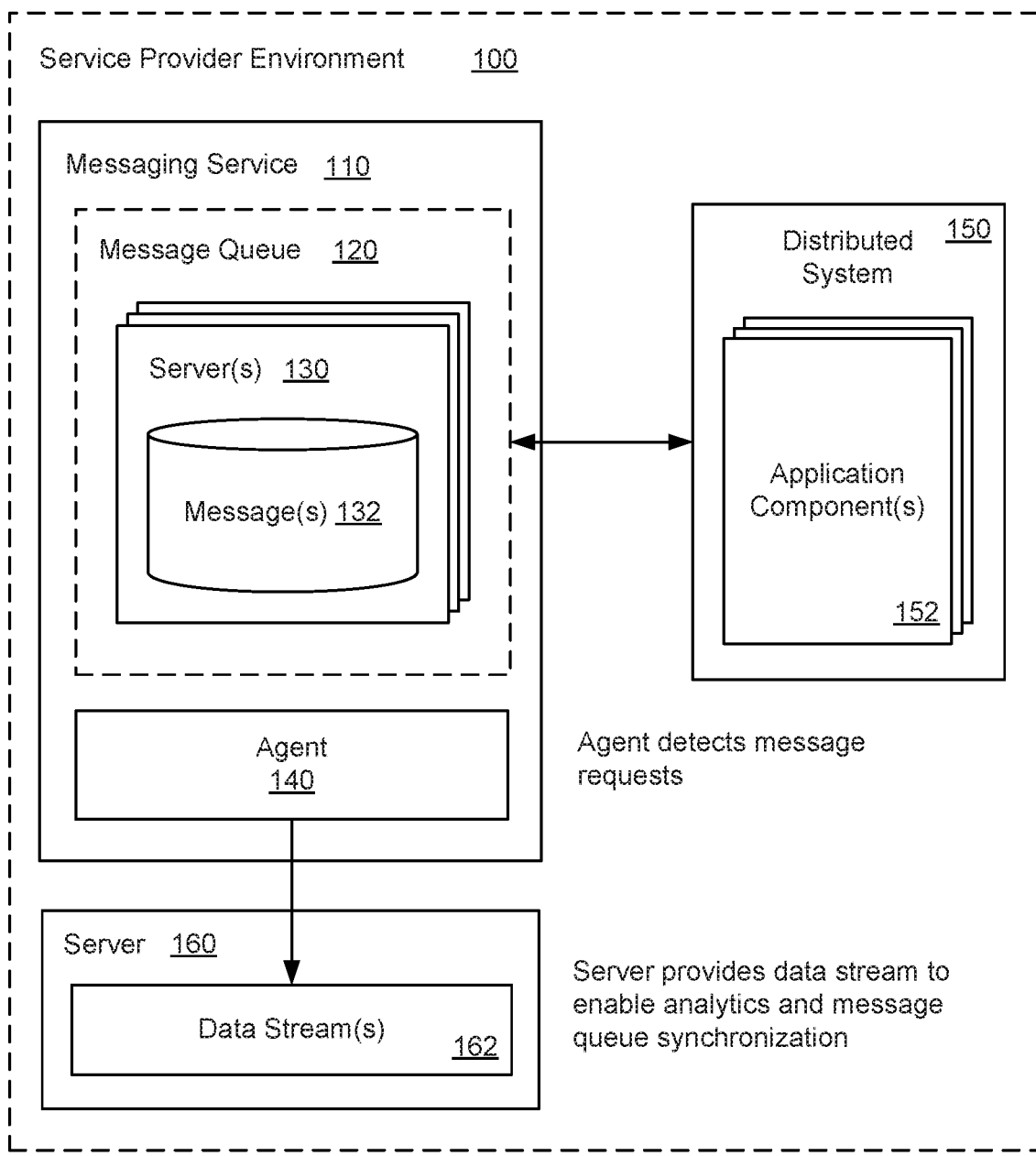
FIG. 1 illustrates a system and related operations for generating data streams using message requests to a message queue according to an example of the present technology.

A technology is described for generating data streams using message requests (e.g., including sending messages, receiving messages, deleting messages, etc.) to a message queue in a service provider environment. A messaging service operating in the service provider environment may maintain the message queue. The message requests may be received from requestors (e.g., application components of a distributed application, clients, devices, etc.) in communication via the service provider environment. The message queue may be a repository of messages for consumption by requestors in the service provider environment. For example, the requestors may communicate message requests in order to send messages to the message queue, receive messages from the message queue and delete messages from the message queue. The message requests may be used to generate the data stream, and the data stream may enable analytics to be performed on the message queue. In addition, the data stream may enable replication and synchronization of the message queue across multiple geographic regions in the service provider environment.

In one example, an agent may detect the message requests sent from the requestors to the message queue maintained by the messaging service. Message attribute information may be identified for each of the message requests sent to the message queue. The message attribute information may include, but is not limited to, an Internet Protocol (IP) address of an entity that sends the message request, a time stamp that corresponds to a sending of the message request, security key information utilized by the entity that sends the message request, a message identifier (ID) and/or message size information.

The data stream may be generated in response to the message requests and include corresponding message attribute information. In other words, each message request sent to the message queue and the corresponding message attribute information may have corresponding information which is published in the data stream. The data stream may be accessible to devices, computer clients, or customers that have permissions to access the data stream. For example, the permissions may be defined by an owner of the message queue and/or an operator of the service provider environment.

In one example, the data stream may be consumed by an analytics module to enable analytics to be performed on the message queue. For example, the data stream may identify particular entities that are sending message requests to the message queue at a rate that is above a defined threshold. The analytics performed on the data stream may indicate entities that are associated with unauthorized accounts or accounts that are not authorized to send message requests to the message queue. In one example, the data stream may be provided to an analytical data streaming service that operates in the service provider environment, and the analytical data streaming service may perform analytics on the data stream in order to obtain knowledge about the message queue.

In one configuration, the data stream may be consumed to enable replication and synchronization of the message queue across multiple geographic regions in the service provider environment. For example, the data stream may be provided to enable the message requests indicated in the data stream to be propagated to message queues replicated across multiple geographic regions in the service provider environment. As a result, the message queues across the multiple geographic regions may be synchronized with each other. In one example, the synchronization between the message queues across the multiple geographic regions of the service provider environment may be utilized for disaster recovery. Therefore, as an example, when a message queue is unavailable in a first geographic region, an up-to-date copy of the message queue may be accessed from a second geographic region.

FIG. 1 illustrates an exemplary system and related operations for generating data streams 162 using message requests to a message queue 120. The message queue 120 may be maintained by a messaging service 110 that operates in a service provider environment 100. The message queue 120 may include messages 132 that are stored across a plurality of servers 130. In addition, the service provider environment 100 may include a distributed system 150. The distributed system 150 may include a plurality of application components 152. For example, the distributed system 150 may include all application components 152 that run on servers, clusters, computing instances, etc. within the service provider environment 100. The application components 152 may include reusable program building blocks that, when combined with other application components within the service provider environment 100, form an application. Non-limiting examples of the application components 152 may include a button in a graphical user interface, an interest calculator, an interface to a database manager, etc. The application components 152 may include a process or thread. The application components 152 may be deployed on different servers within the service provider environment 100 and communicate with each other in order to perform requested services. In addition, the distributed system 150 may be divided into the application components 152, which may each be comprised of various modules.

In one example, the messaging service 110 may include an agent 140 that detects message requests sent from the application components 152 of the distributed system 150 to the message queue 120. The message requests may include requests to send messages 132 to the message queue 120, requests to receive messages 132 from the message queue 120 and requests to delete messages 132 from the message queue 120.

The agent 140 may provide the message requests to a server 160 that operates in the service provider environment 100. The server 160 may generate a data stream 162 from the message requests received from the agent. The data stream 162 may include message attribute information associated with each message request, such as an Internet Protocol (IP) address of an application component 152 that sends the message request, a time stamp that corresponds to a sending of the message request, security key information utilized by the application component 152 that sends the message request, a message identifier (ID), an operation specified, other data in the message request, etc.

In one example, the server 160 may provide the data stream 162 for consumption of the message attribute information. In example, the data stream 162 may be consumed to enable analytics to be performed on the message queue 120. For example, the analytics may be performed to achieve intrusion detection for the message queue 120. In other words, based on the analytics of the message attribute information (e.g., IP addresses of message requestors), a determination may be made that the message requests are from unauthorized parties. In another example, the data stream 162 may be configured to enable replication and synchronization of the message queue 120 across multiple geographic regions in the service provider environment 100. More specifically, the message requests included in the data stream 162 may be propagated or duplicated in message queues 120 across the multiple geographic regions, thereby achieving synchronization between the message queues 120 across the multiple geographic regions.

Figure 2:
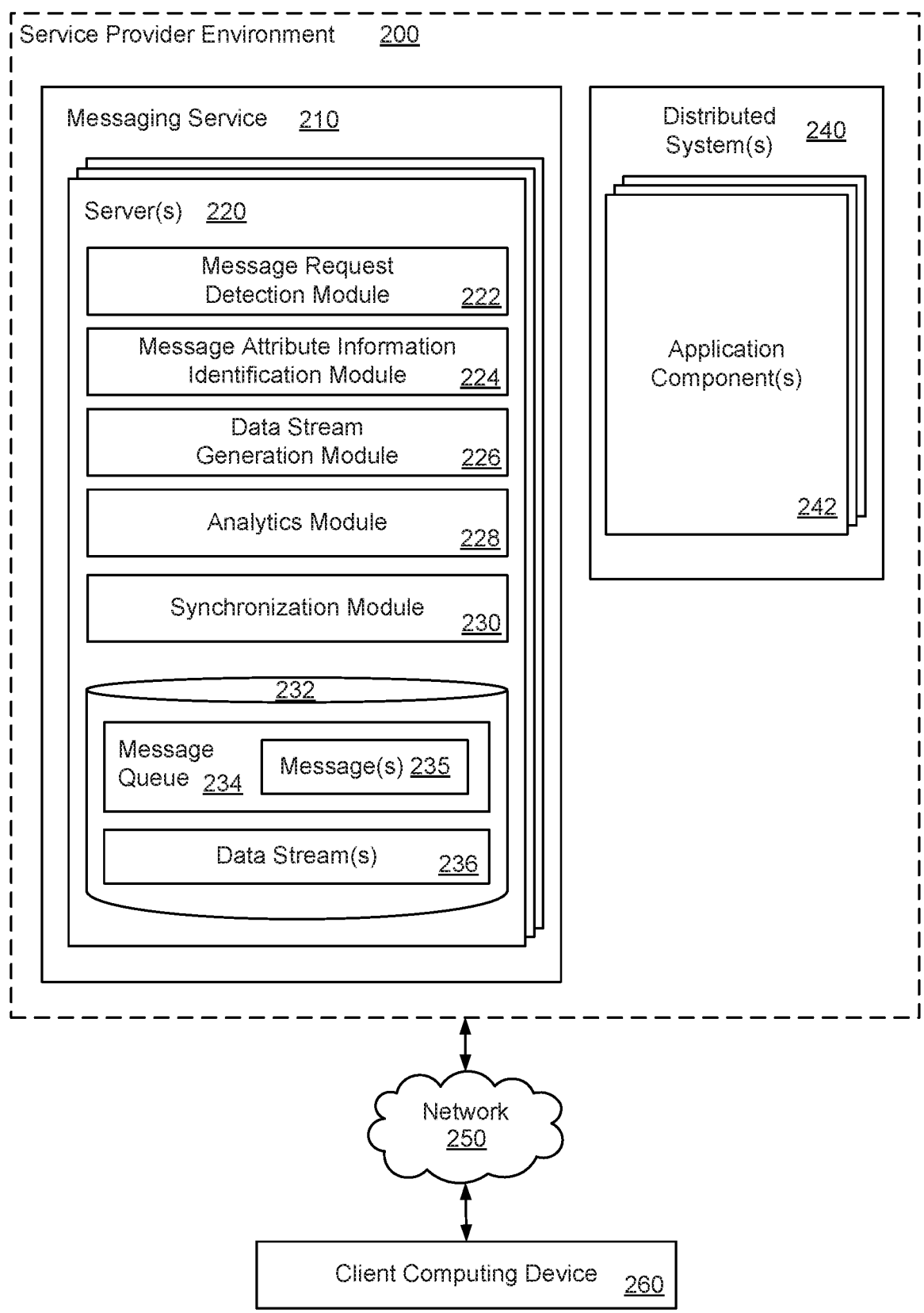
FIG. 2 is an illustration of a networked system for generating data streams using message requests to a message queue according to an example of the present technology.

FIG. 2 illustrates components of an example service provider environment 200 according to one example of the present technology. The service provider environment 200 may include a messaging service 210 and a distributed system 240. The distributed system 240 may include a plurality of application components 242. For example, the distributed system 240 may include all application components 242 that run on servers, clusters, computing instances, etc. within the service provider environment 200. The application components 242 may include reusable program building blocks that, when combined with other application components within the service provider environment 200, form an application. The application components 242 may be deployed on different servers within the service provider environment 200 and communicate with each other in order to perform requested services. As an example, the application components 242 may be associated with a web application executing in the service provider environment 200. The messaging service 210 may operate one or more servers 220 and data store(s) 232 to store messages 235 in a message queue 234. The messages 235 may be used by the application components 242 of the distributed system 240 or by a client computing device(s) 260. The messaging service 210 may be in communication with a client computing device 260 via a network 250.

In one example, the data store 232 may include messages 235. The messages 235 may be included in the message queue 234 maintained by the messaging service 210. The messages 235 may be exchanged between the application components 242 of the distributed system 240 through the messaging service 210. For example, messages 235 may be generated by a first application component of the distributed system 240, and the messages 235 may be consumed by a second application component of the distributed system 240. The messages 235 may be stored in the data store 232 until the messages 235 are processed by one or more application components 242 at which point the messages may be deleted by the application components 242 or clients. The messages 235 may be communicated between the application components 242 in order to coordinate actions performed by the application components 242. The messages 235 may contain up to a defined amount of text in a defined format (e.g., 256 KB of text). The messages 235 may include various functions, parameters, attributes, settings, etc. to be implemented at the application components 242 that consume the messages 235. Examples of message attributes may include timestamps, geospatial data, signatures and identifier(s) about the messages 235. In addition, each message 235 may include sequencing information, such that the messages 235 may be reordered after being returned from the message queue 234.

In one example, the data store 232 may include data streams 236 (also referred to as data output). The data streams 236 may indicate a plurality of message requests sent by the application components 242 of the distributed system 240. The message requests may be sent from the application components 242 to the messaging service 210. The message requests may include requests to send messages 235 to the message queue 234, requests to receive messages 235 from the message queue 234 and requests to delete messages 235 from the message queue 234. In addition, the data streams 236 may include message attribute information for each message request included in the data stream 236. The message attribute information may include: an Internet Protocol (IP) address of an application component 242 that sends the message request, a time stamp that corresponds to a sending of the message request, security key information utilized by the application component 242 that sends the message request, and a message identifier (ID) for the message requests. The data stream 236 may provide an aggregate view of the message requests and the corresponding message attribute information. The data stream 236 may be constantly modified as additional message requests are sent from the application components 242 to the messaging service 210. In addition, the data streams 236 may be associated with or have various permissions, such that the data streams 236 may be accessible and/or inaccessible to certain entities or customers.

The server(s) 220 operated by the messaging service 210 may include a number of modules for generating data streams 236 using message requests from the application components 242 or other clients. The server(s) 220 may include a message request detection module 222, a message attribute information identification module 224, a data stream generation module 226, an analytics module 228, a synchronization module 230, and other applications, services, processes, systems, engines, or functionality not discussed in detail herein.

The message request detection module 222 may be configured to detect a plurality of message requests that are sent from the application components 242 to the message queue 234 managed by the messaging service 210. The message requests from the application components 242 may include requests to send messages 235 to the message queue 234, requests to receive messages 235 from the message queue 234, and requests to delete messages 235 from the message queue 234. In one example, the message request detection module 222 may be an agent or worker process that intercepts message requests sent from the application components 242 of the distributed system 240. In other words, the message request detection module 222 may detect message requests that are received from the application components 242 and are destined for the message queue 234.

The message attribute information identification module 224 may be configured to identify message attribute information for each of the plurality of message requests. The message attribute information may indicate an identity of the application components 242 that are sending the message requests to the message queue 234. More specifically, the message attribute information may include for each message request an Internet Protocol (IP) address of an application component 242 that sends the message request, a time stamp that corresponds to a sending of the message request, security key information utilized by the application component 242 that sends the message request, a message identifier (ID) and message size information. In addition, the message attribute information may include other types of attributes and/or metadata. In one example, the message attribute information identification module 224 may perform a packet inspection to identify the message attribute information from the message requests.

The data stream generation module 226 may be configured to generate data streams 236 (or data output) that include the plurality of message requests and corresponding message attribute information. In other words, the data stream generation module 226 may associate each message request with corresponding message attribute information (e.g., IP addresses, time stamp, security key information, message ID, message size information). The data streams 236 may provide an aggregate view of the plurality of message requests and the corresponding message attribute information. In one example, the data stream generation module 226 may set permissions for the data streams 236. For example, the data stream generation module 226 may define the data streams 236 to be accessible to certain entities and not accessible to other entities. The data stream generation module 226 may define the permissions based on instructions received from, for example, the client computing device 260.

The analytics module 228 may be configured to perform analytics using the data stream 236 in order to obtain knowledge about the message queue 234. The analytics module 228 may perform analytics to determine trends, patterns, etc. in the contents of the data stream 236, which may enable the analytics module 228 to make various deductions about the message queue 234. For example, the analytics module 228 may determine patterns regarding the types of message requests sent to the message queue 234. The analytics module 228 may determine patterns regarding which requestors (e.g., application components 242) are often sending message requests to the message queue 234. As an example, the analytics module 228 may deduce that a first application component in the distributed system 240 sends message requests approximately every 30 minutes, whereas a second application component in the distributed system 240 sends message requests approximately every 5 minutes. Thus, if a component begins to send message requests every second, then this may represent a problem with the application component. The analytics module 228 may include a plurality of predefined analytical tests that can be performed using the data stream 236 in order to obtain knowledge about the message queue 234. In addition, the analytical module 228 may receive definitions or instructions for additional analytical tests, for example, from the client computing device 260.

In one example, based on message attribute information included in the data stream 236, the analytics module 228 may identify application components 242 that are sending message requests to the message queue 234. The analytics module 228 may detect certain application components 242 that are associated with unauthenticated accounts or accounts that are not authorized to send message requests to the message queue 234. These application components 242 may be maliciously sending message requests to the message queue 234. By constantly analyzing new message requests that are included in the data stream 236, the analytics module 228 may perform intrusion detection and send an alert when such application components 242 or clients are detected.

The synchronization module 230 may be configured to use the data stream 236 for replication and synchronization of the message queue 234 across multiple servers 220 in multiple geographic regions of the service provider environment 200. For example, the synchronization module 230 may select predefined types of message requests from the data stream 236 (e.g., requests to send messages, requests to receive message and requests to delete messages). The synchronization module 230 may have counterpart synchronization modules in other geographic regions to receive and perform the predefined types of message requests with respective message queues 234 that are replicated across the multiple geographic regions in the service provider environment 200, which may result in multiple message queues 234 that are synchronized between the multiple geographic regions of the service provider environment 200.

In other words, the synchronization module 230 may propagate or duplicate the message requests included in the data stream 236 to replicated message queues 234 distributed across the different geographic regions. The propagation of the message requests to the message queues 234 may effectively result in the synchronization between the message queues 234 in the different geographic regions. In one example, the replication and synchronization of the message queues 234 across the different geographic regions may be useful for disaster recovery. For example, if the message queue 234 fails in a first geographic region, an up-to-date copy of the message queue 234 may be available in a second geographic region.

As a non-limiting example, a first geographic region may include a first message queue with messages A, B, C, D and E. A copy of the first message queue (referred to as a second message queue) may be included in a second geographic region. Two message requests may be performed with respect to the first message queue—a message request to delete message C from the first message queue and a message request to send message F to the first message queue. The two message requests may be indicated in a data stream. After the two message requests are performed with the first message queue, the first message queue may include messages A, B, D, E and F. In one example, based on the indication of the two message requests in the data stream, the two message requests may be propagated to the second message queue in the second geographic region. As a result, similar to the first message queue, the second message queue may include messages A, B, D, E and F after the two message requests are performed in the second message queue. Therefore, the first message queue in the first geographic region may be replicated to form the second message queue in the second geographic region. In addition, modifications to the first message queue may be propagated to the second message queue (i.e., the first message queue may be synchronized with the second message queue) based on the contents of the data stream.

The client computing device 260 may comprise a computer system that is embodied in the form of a desktop computer, a laptop computer, mobile devices, cellular telephones, smartphones, set-top boxes, network-enabled televisions, tablet computer systems, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
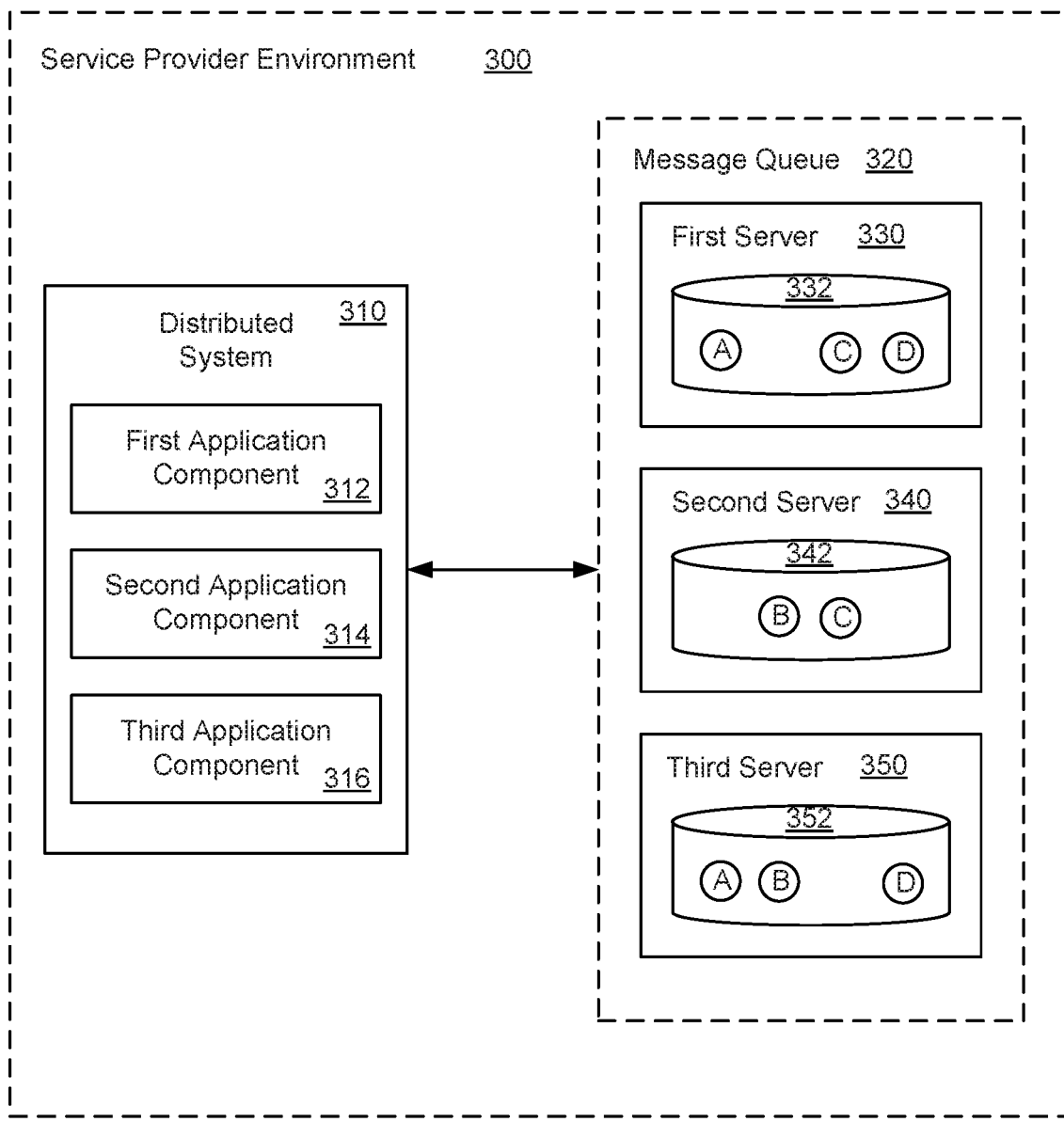
FIG. 3 illustrates a relationship between application components in a distributed system and a message queue according to an example of the present technology.

FIG. 3 illustrates an exemplary relationship between application components in a distributed system 310 and a message queue 320 in a service provider environment 300. The distributed system 310 may include a first application component 312, a second application component 314 and a third application component 316. These application components may include, for example, software running on virtual machine instances, X, Y, and Z. The message queue 320 may be a repository of messages that are stored in a first server 330 with a first data store 332, a second server 340 with a second data store 342, and a third server 350 with a third data store 352. In other words, the message queue 320 may be distributed across multiple servers 330, 340, 350 in the service provider environment 300. In addition, the application components 312, 314, 316 may send requests to send messages to the message queue 320, receive messages from the message queue 320 and/or delete messages from the message queue 320.

As a non-limiting example, the first data store 332 may include messages A, C and D, the second data store 342 may include messages B and C, and the third data store 352 may include messages A, B and D. The same message may be redundantly stored in multiple servers to increase robustness. For example, message A may be stored in both the first data store 332 and the third data store 352.

Figure 4:
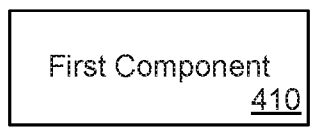
FIG. 4 illustrates a lifecycle of a message in a message queue according to an example of the present technology.
Figure 4:
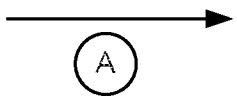
Figure 4:
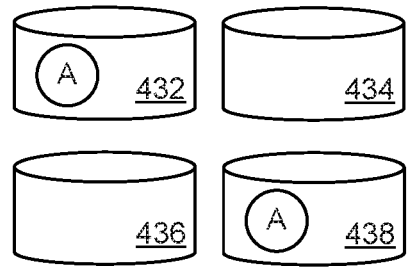
Figure 4:
Figure 4:
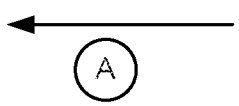
Figure 4:
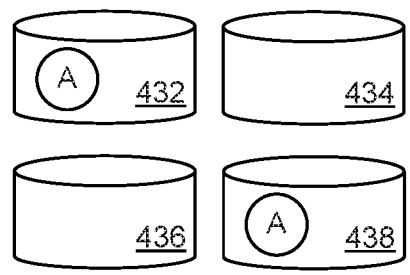
Figure 4:
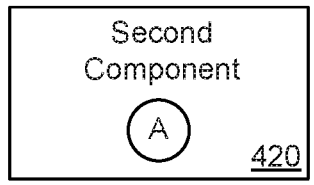
Figure 4:
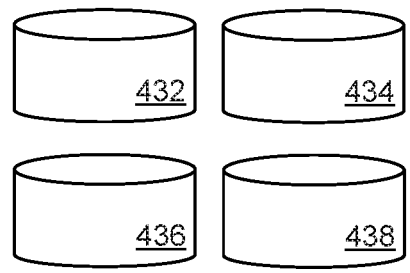

FIG. 4 illustrates an exemplary lifecycle of a message in a message queue 430. The message queue 430 may include multiple data stores, such as a first data store 432, a second data store 434, a third data store 436 and a fourth data store 438. In step 1, a first component 410 (e.g., an application component of a distributed application) may send message A to the message queue 430. As an example, message A may be redundantly distributed across the data stores 432, 438. In step 2, a second component 420 may be ready to process message A. At this time, the second component 420 may retrieve message A from the message queue 430. For example, the second component 420 may retrieve message A from the data stores 432, 438. While message A is being processed at the second component 420, message A may remain in the message queue 430. However, message A may not be returned to subsequent requests for message A for a duration of a timeout period. In step 3, the second component 420 may process message A accordingly. In addition, the second component 420 may delete message A from the message queue 430 during the timeout period. The second component 420 may delete message A from the message queue 430 to prevent message A from being received and processed again at another component (e.g., a third component) after expiry of the timeout period.

Figure 5:
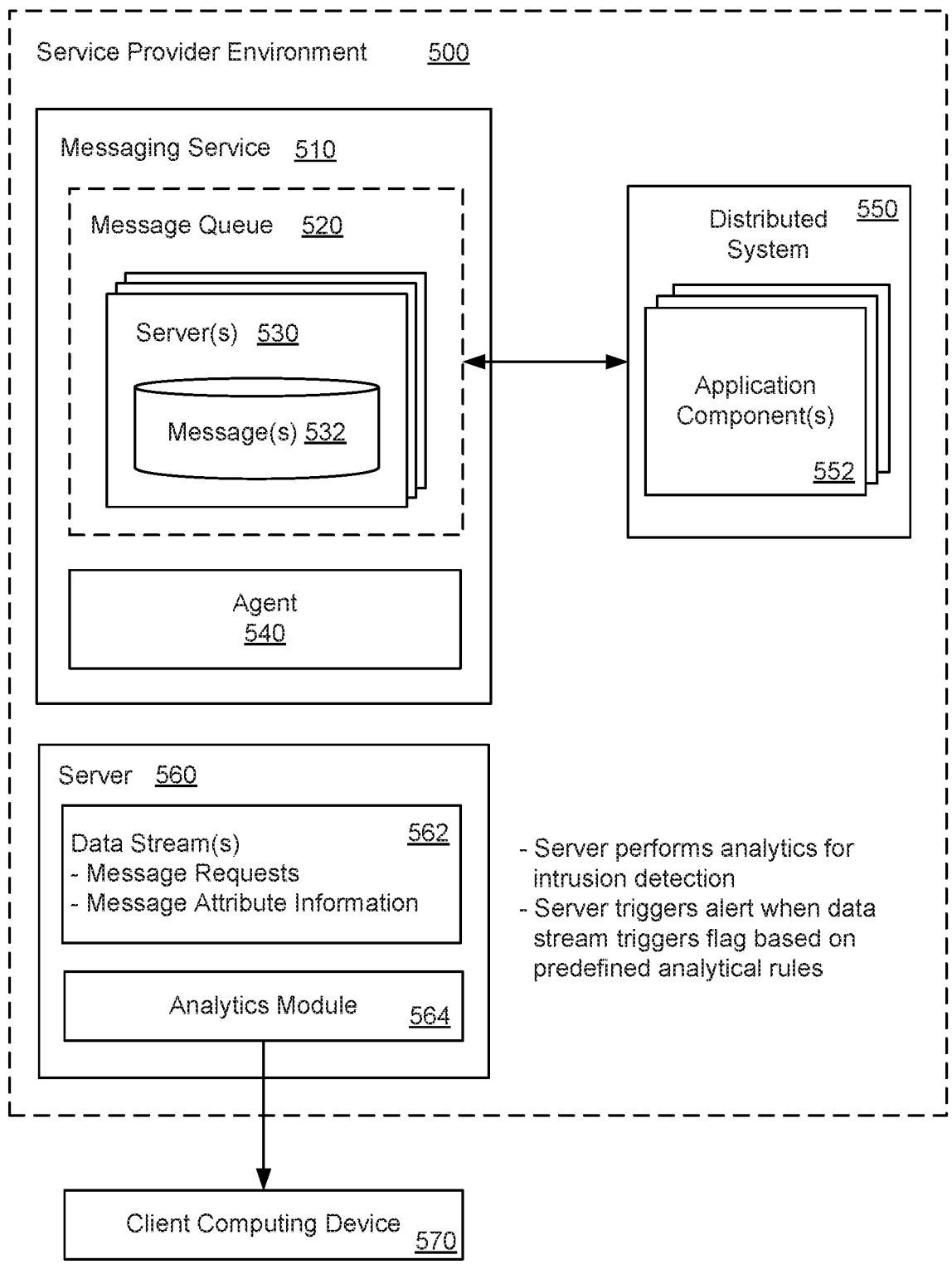
FIG. 5 illustrates a system and related operations for generating data streams using message requests to a message queue and performing analytics on the message queue according to an example of the present technology.

FIG. 5 illustrates an exemplary system and related operations for generating data streams 562 using message requests to a message queue 520 to perform analytics on the message queue 520. The message queue 520 may be maintained by a messaging service 510 that operates in a service provider environment 500. The message queue 520 may include messages 532 that are stored across a plurality of servers 530. In addition, the service provider environment 500 may include a distributed system 550 with a plurality of application components 552.

In one example, the messaging service 510 may include an agent 540. The agent 540 may detect message requests sent from the application components 552 of the distributed system 550 to the message queue 520. The agent 540 may determine the types of message requests that are sent from the application components 552. For example, the message requests may include requests to send messages 532 to the message queue 520, requests to receive messages 532 from the message queue 520 and requests to delete messages 532 from the message queue 520. The agent 540 may function to intercept and decode the message requests as the message requests are being sent from the application components 552 to the message queue 520. The agent 540 may function as an intermediary between the application components 552 and the message queue 520. In one example, a configuration flag may be set in the message queue 520 that enables the message requests to be captured by the agent 540. In addition, the agent 540 may detect other types of requests sent from the application components 552, such as requests to create the message queue 520 or requests to modify the message queue 520.

As non-limiting examples, the application components 552 may include component 1 and component 2, and the messages 532 may include messages A, B and C. The agent 540 may detect when component 1 initiates a request to send message A to the message queue 520. The agent 540 may detect when component 2 initiates a request to receive message A to the message queue 520. In addition, the agent 540 may detect when component 2 initiates a request to delete message A from the message queue 520.

In one example, the agent 540 may provide the message requests to a server 560 that operates in the service provider environment 500. The server 560 may identify message attribute information associated with the message requests. For example, the server 560 may perform a packet inspection on the message requests to identify message attribute information embedded in the message requests. The message attribute information may include, for each message request, an Internet Protocol (IP) address of an application component 552 that sends the message request, a time stamp that corresponds to a sending of the message request, security key information utilized by the application component 552 that sends the message request, a message identifier (ID), message size information, etc. The server 160 may generate the data stream 562 to include the message requests and corresponding message attribute information. In other words, the data stream 562 may provide an aggregated view of the message requests and the corresponding message attribute information. The server 160 may provide the data stream 562 to an analytics module 564 that operates in the service provider environment 500.

In one configuration, the analytics module 564 may perform analytics using the data stream 562 in order to obtain knowledge about the message queue 520. For example, the analytics module 564 may perform analytics to determine trends, patterns, etc. in the contents of the data stream 562, which may then be used to gather knowledge or make deductions about the message queue 520. For example, the analytics module 564 may identify patterns regarding the types of message requests that are often sent from the application components 552 to the message queue 520. The analytics module 564 may identify patterns regarding which requestors (e.g., application components 552) are often sending message requests to the message queue 520. In one example, the analytics module 564 may generate an analytics report, and the analytics report may be provided to, for example, a client computing device 570. Based on the analytics report, various business decisions may be made with respect to the application components 552 and the message queue 520.

In one example, analytics data may be stored in a relational database (not shown) in the service provider environment 500. For example, the relational database may utilize Structured Query Language (SQL), and SQL queries may be performed against the analytical data stored in the relational database. Alternatively, the analytical data may be stored in a non-relational database, such as a NoSQL database, NewSQL database, EXtensible Markup Language (XML) database, object oriented database, etc.

In one example, the analytics module 564 may execute a series of predefined analytical tests on the data stream 562 in order to obtain knowledge about the message queue 520. For example, the analytics tests may be performed in order to obtain knowledge about the message queue 520, such as trends, patterns, etc. in the contents of the data stream 562. In addition, the analytical module 564 may receive definitions or instructions for additional analytical tests, for example, from the client computing device 570. The analytics module 564 may perform the analytical tests and provide an output to the client computing device 570.

In one example, the analytics module 564 may be part of a separate analytics service that executes in the service provider environment 500. The analytics module 564 may receive the data stream 562 as an input from the agent 540, and the analytics module 564 may process and analyze the data stream 562. For example, the analytics module 564 may run standard queries, such as Structured Query Language (SQL) queries, against the data stream 562. Depending on the queries that are run against the data stream 562, certain data points may be extracted from the data stream 562 and subsequently used to perform the analysis.

In one example, depending on the analysis generated from the data stream 562, an alert may be triggered. In other words, the data stream 562 may be processed using various analytical rules, and when certain flags are triggered during the processing of the data stream 562, the alert may be generated. The alert may be provided to the client computing device 570.

In one configuration, the data stream 562 may be accessible to an entity that has permission to access the data stream 562. For example, the data stream 562 may be provided to the client computing device 570, assuming that the client computing device 570 has been previously authorized to access the data stream 562. The client computing device 570 may instruct the analytics module 564 to run various analytical rules or perform various queries against the data stream 562 in order to determine knowledge about the message queue 520. Alternatively, the client computing device 570 may locally save the data stream 562, and the client computing device 570 may locally run analytical tools against the data stream 562 to determine knowledge about the message queue 520.

In one example, the analytics module 564 may be used for intrusion detection. For example, the data stream 562 may include the IP addresses of application components 552 that are sending message requests to the message queue 520, and the analytics module 564 may extract the IP addresses from the data stream 562. The analytics module 564 may identify an IP address that has not been previously included in the data stream 562. The analytics module 564 may compare the IP address to a list of approved IP addresses, and based on the comparison, the analytics module 564 may determine that the IP address is not included in the list of approved IP addresses. In this example, the analytics module 564 may infer that an application component 552 with that IP address is associated with an unauthenticated account and/or an account that is unauthorized to send message requests to the message queue 520. The analytics module 564 may provide this information to the client computing device 570. In another example, the analytics module 564 may compare the IP address to a list of potentially malicious IP addresses, and based on the comparison, the analytics module 564 may determine that the IP address is included in the list of potentially malicious IP addresses. In this example, the analytics module 564 may send an alert to the client computing device 570 to indicate an attacker. In other words, the analytics module 564 may indicate that the attacker is maliciously sending message requests to the message queue 520.

As a non-limiting example, the application components 552 may include component 1 and component 2, and the message queue 520 may include messages A, B and C. An attacker may set up a malicious account and initiate a request to read message B from the message queue 520. The message request from the attacker (and corresponding message attribute information) may be published to the data stream 562. Based on an analysis of the data stream 562, the analytics module 564 may generate an alert indicating that the attacker maliciously initiated the request to read message B from the message queue 520. The analytics module 564 may send the alert to the client computing device 570, and the client computing device 570 may make appropriate decisions to handle the attacker.

Figure 6:
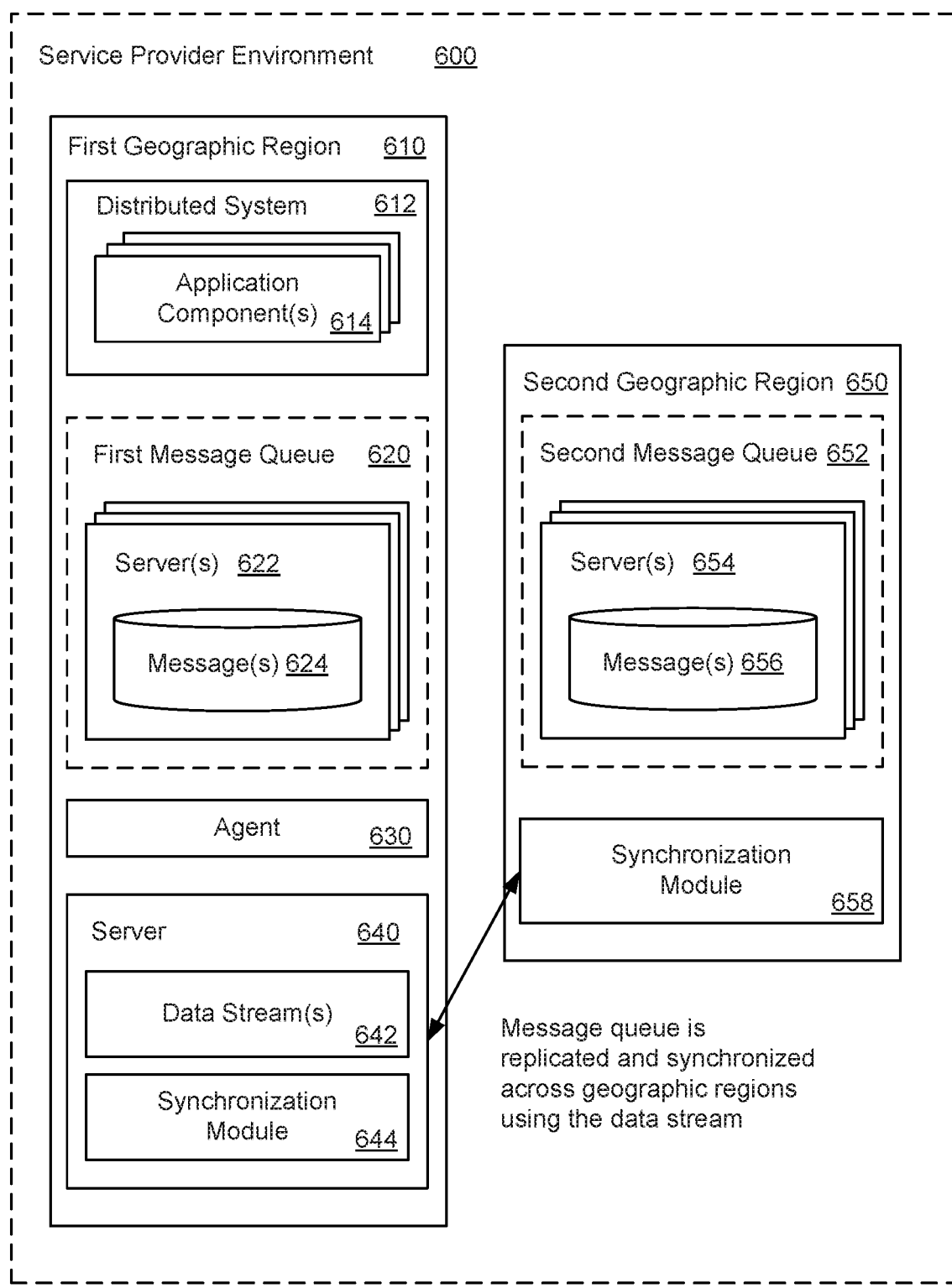
FIG. 6 illustrates a system and related operations for generating data streams using message requests to a message queue to perform replication and synchronization of the message queue across multiple geographical regions according to an example of the present technology.

FIG. 6 illustrates an exemplary system and related operations for generating data streams 642 using message requests to a first message queue 620 to perform replication and synchronization of the first message queue 620 across multiple geographical regions. The first message queue 620 may be maintained in a first geographic region 610 of a server provider environment 600. The first message queue 620 may include messages 624 that are stored across a plurality of servers 622. In addition, the service provider environment 600 may include a distributed system 612 with a plurality of application components 614.

In one example, the first geographic region 610 may include an agent 630 that detects message requests sent from the application components 614 of the distributed system 612 to the first message queue 620. The agent 540 may provide the message requests to a server 640 that operates in the service provider environment 600. The server 640 may identify message attribute information (e.g., IP addresses, time stamps, security key information, message IDs, message sizes) associated with the message requests. The server 640 may generate the data stream 642 to include the message requests and corresponding message attribute information. The server 640 may provide the data stream 642 to a synchronization module 644 that operates in the service provider environment 600.

In one example, the service provider environment 600 may include a second geographic region 650. The second geographic region 650 may include a second message queue 652, which may be a replica of the first message queue 620 in the first geographic region 610. Similar to the first message queue 620, the second message queue 652 may include messages 656 that are stored across a plurality of servers 654. In addition, the messages 656 stored in the second message queue 652 may be the same as the messages stored in the first message queue 620.

In one example, the synchronization module 644 may identify selected types of message requests from the data stream 642. For example, the synchronization module 644 may identify requests from the application components 614 to send messages 624 to the first message queue 620, requests from the application components 614 to receive messages 624 from the first message queue 620, and requests from the application components 614 to delete messages 624 from the first message queue 620. The synchronization module 644 may ignore other types of message requests included in the data stream 642 (e.g., requests to create the first message queue 620 or requests to modify the first message queue 620).

The synchronization module 644 may perform the selected types of message requests indicated in the data stream 642 with the second message queue 652 included in the second geographic region 650. In other words, message requests that are performed with the first message queue 620 may be propagated or duplicated for the second message queue 652, for example, using a distributed propagation technique. As the data stream 642 is processed at the synchronization module 644, the synchronization module 644 may instruct for the selected types of message requests performed with the first message queue 620 to also be performed with the second message queue 652, thereby achieving synchronization between the first message queue 620 and the second message queue 652.

In general, the first message queue 620 may be replicated across multiple geographic regions in the service provider environment 600 to increase reliability and robustness. Therefore, if the first message queue 620 becomes unavailable, customers may instead access the second message queue 652 in the second geographic region 650. From the customer's perspective, switching to the second message queue 652 may be a seamless transition because the second message queue 652 is a replica of the first message queue 620. In addition, since the second message queue 652 may be synchronized with the first message queue 620, the same messages 624 that were included in the first message queue 620 may also be included in the second message queue 652.

In one example, the first and second message queues 620, 652 may be automatically synchronized, such that the customer does not have to manually instrument redundancy of the first message queue 620 in other geographic regions. In contrast, in previous solutions, customers had to manually perform the same message requests in multiple geographic regions in order to maintain a consistent view of the message queue across multiple geographic regions. For example, in previous solutions, when a customer deleted messages from a message queue in the first region, the customer had to remember to delete the messages from a message queue in the second region. At a later time, if the customer began using the message queue in the second region, messages that were mistakenly not deleted would cause problems when message requests were sent to the message queue in the second region. However, when the multiple message queues are automatically synchronized, the customer may migrate between regions while maintaining a consistent view of the message queue.

As a non-limiting example, the first message queue 620 in the first geographic region 610 may include messages A, B, C and D, and the application components 614 may include a first component and a second component. The first message queue 620 may be replicated to produce the second message queue 652 in the second geographic region 650. Similar to the first message queue 620, the second message queue 652 may include messages A, B, C and D. As non-limiting examples, the first component may initiate requests to send message E to the first message queue 620, receive message B from the first message queue 620 and delete message C from the first message queue 620. These requests may be published to the data stream 642. The synchronization module 644 may consume the data stream 642 and determine that these requests have been performed with respect to the first message queue 620. Therefore, the synchronization module 644 may propagate the same requests to the second message queue 652. Therefore, message E may be sent to the second message queue 652, message B may be received from the second message queue 652 and message C may be deleted from the second message queue 652. In this example, message E may be sent from the first geographic region 610 to the second geographic region 650, such that the second message queue 652 may have the ability to receive message E. As a result, the synchronization module 644 may function to synchronize the messages 624 included in the first message queue 620 with the messages 656 included in the second message queue 652.

In one configuration, the second geographic region 650 may include a separate synchronization module 658. In this configuration, the synchronization module 658 may listen to (or process) the data stream 642 produced by the server 640 in the first geographic region 610. In other words, the synchronization module 658 in the second geographic region 650 may detect the message requests that have occurred in the first geographic region 610. The synchronization module 658 may duplicate the message requests with respect to the second message queue 652, thereby ensuring that the second message queue 652 may be synchronized with the first message queue 620.

Figure 7:
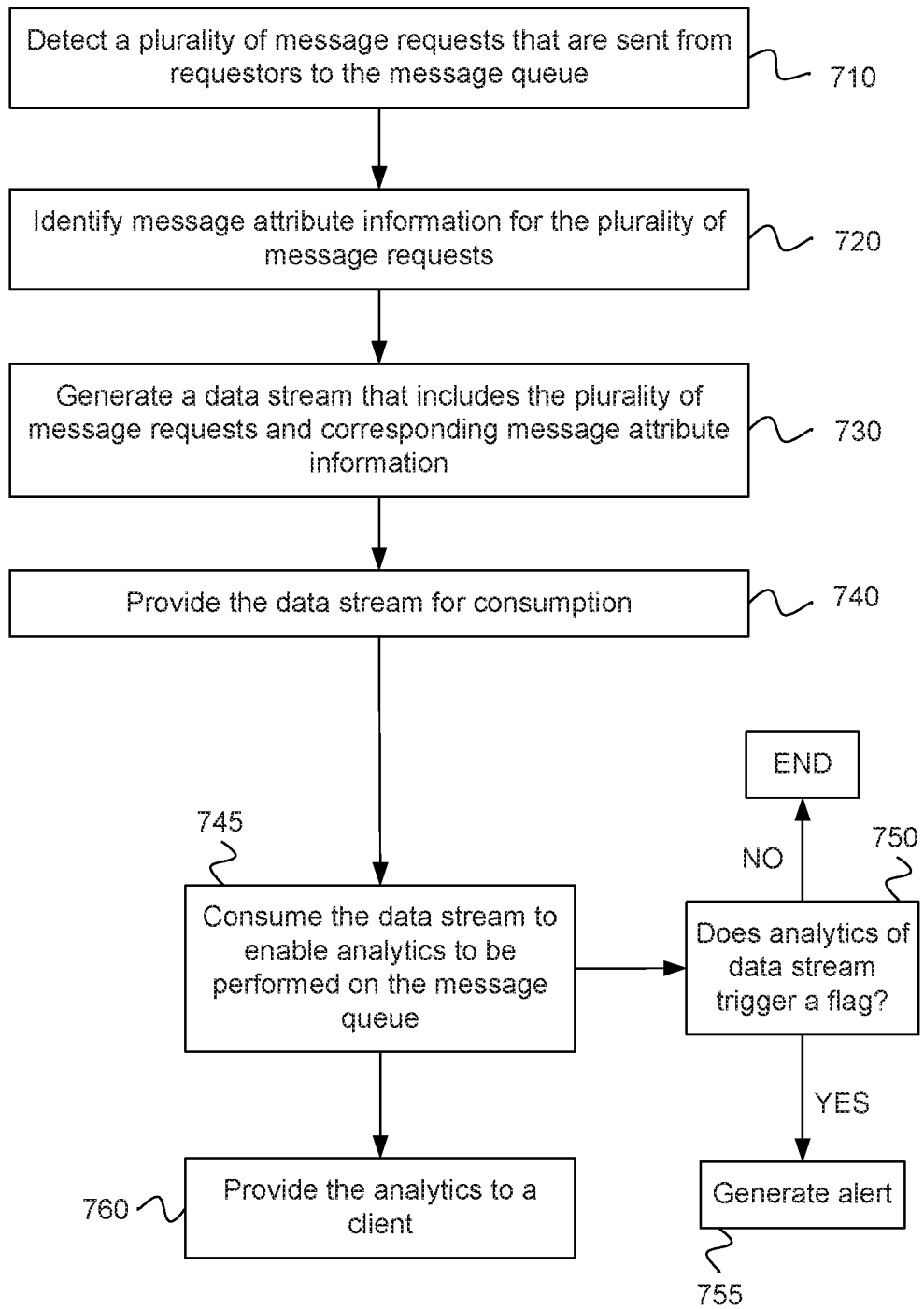
FIG. 7 is a flowchart of an example method for generating data streams using message requests to a message queue in a service provider environment.

FIG. 7 illustrates an example of a method for generating data streams using message requests to a message queue in a service provider environment. A plurality of message requests that are sent from requestors to the message queue may be detected via an agent, as in block 710. The message queue may store messages for usage by the requestors. One example of the requestors may include application components. The message queue may be operated by a messaging service executing in a service provider environment.

Message attribute information associated with the plurality of message requests may be identified, as in block 720. The message attribute information may indicate an identity of the requestors that are sending the message requests to the message queue. More specifically, the message attribute information may include, for each message request, an Internet Protocol (IP) address of an application component that sends the message request, a time stamp that corresponds to a sending of the message request, security key information utilized by the application component that sends the message request, and a message identifier (ID).

A data stream may be generated that includes the plurality of message requests and corresponding message attribute information, as in block 730. The data stream may provide an aggregate view of the message requests and corresponding message attribute information. The data stream may be accessible to an entity that has permission to access the data stream. The permissions for the data stream may be defined by an operator of the message queue.

The data stream may be provided for consumption, as in block 740. In one example, as in block 745, the data stream may be consumed to enable analytics to be performed on the message queue. For example, the analytics may result in a determination that certain message requests are sent from requestors associated with unauthenticated accounts or accounts that are not authorized to send message requests to the message queue. The analytics may be provided to a client, as in block 760. In addition, a determination may be performed as to whether the analytics of the data stream triggers a flag, as in block 750. When the analytics of the data stream triggers the flag, an alert may be generated, as in block 755.

In another example, the data stream may be consumed to enable replication and synchronization of the message queue across multiple geographic regions in the service provider environment. For example, types of message requests may be selected from the data stream. The types of message requests may include requests to send messages to the message queue, requests to receive messages from the message queue and requests to delete messages from the message queue. The types of message requests may be performed with respective message queues that are replicated across the multiple geographic regions in the service provider environment, thereby synchronizing multiple message queues between the multiple geographic regions of the service provider environment.

Figure 8:
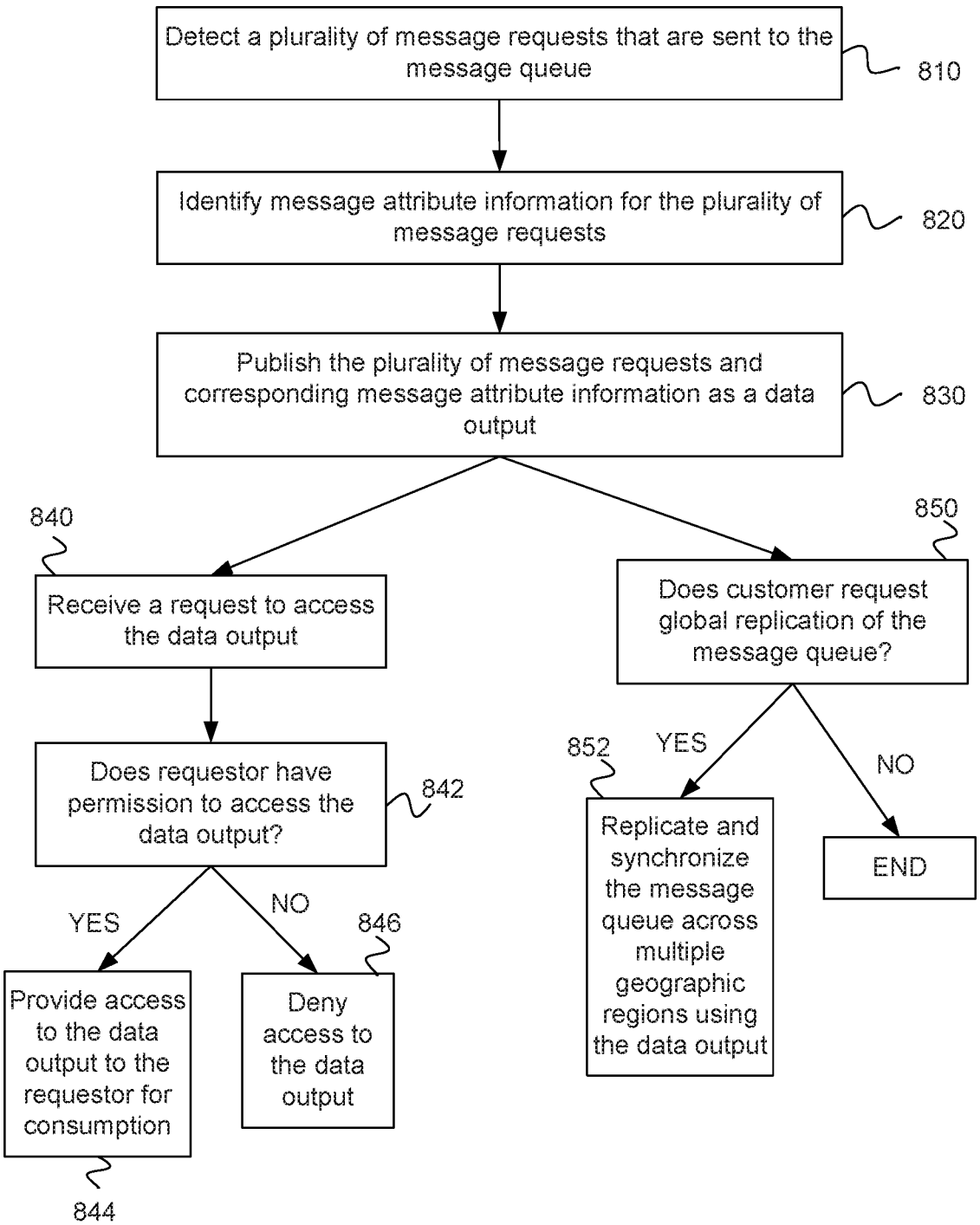
FIG. 8 is a flowchart of an example method for generating data streams using message requests to a message queue.

FIG. 8 illustrates an example of a method for generating data output using message requests to a message queue. A plurality of message requests that are sent to the message queue may be detected, as in block 810. The message requests may be sent to the message queue from application components executing in the service provider environment. The plurality of message requests may include requests to send messages to the message queue, requests to receive messages from the message queue and requests to delete messages from the message queue. In one example, the message queue may be operated by a messaging service executing in a service provider environment, and the message queue may be replicated across a plurality of servers in the service provider environment.

Message attribute information that corresponds to each of the plurality of message requests may be identified, as in block 820. The message attribute information for each message request may include an Internet Protocol (IP) address of a requestor that sends the message request, a time stamp that corresponds to a sending of the message request, security key information utilized by the requestor that sends the message request, and a message identifier (ID).

The plurality of message requests and corresponding message attribute information may be published as a data output, as in block 830. The data output may be processed through the service provider environment. The data output may be accessible to entities that have permission to access the data output.

In one configuration, a request to access the data output may be received from a requestor (e.g., an application component), as in block 840. A determination may be made as to whether the requestor has permission to access the data output, as in block 842. When the requestor has permission to access the data output, the data output may be provided to the requestor for consumption, as in block 844. When the requestor does not have permission to access the data output, access to the data output may be denied, as in block 846. In addition, a determination may be made as to whether a customer requests global replication of the message queue, as in block 850. When global replication is requested by the customer, the message queue may be replicated and synchronized across multiple geographic regions using the data output, as in block 852.

In one example, access to the data output may be provided for consumption of the message attribute information in the data output. For example, access to the data output may be provided to enable analytics to be performed on the message queue. The analytics may be performed on an aggregate view of the plurality of message requests sent to the message queue. In another example, access to the data output may be provided to enable identification of one or more requestors that are sending the plurality of message requests to the message queue. The identification of the one or more requestors may be utilized to implement intrusion detection for the message queue. In yet another example, the data output may be used to determine that certain message requests are sent from unauthenticated accounts or accounts that are not authorized to send message requests to the message queue.

In one example, access to the data output may be provided to enable the message requests indicated in the data output to be propagated to message queues replicated across multiple geographic regions in the service provider environment, which may result in the synchronization between the message queues across the multiple geographic regions of the service provider environment. In addition, the synchronization between the message queues across the multiple geographic regions of the service provider environment may be utilized for disaster recovery.

In one configuration, the plurality of message requests may be detected and published to the data output using an agent that operates in the service provider environment. In another configuration, a configuration flag may be set in the message queue that enables the message requests being sent to the message queue to be captured for publication in the data output. In yet another configuration, analytics may be performed using the message requests and corresponding message attribute information, and an alert may be generated when the data output triggers a flag based on a predefined set of analytics rules.

Figure 9:
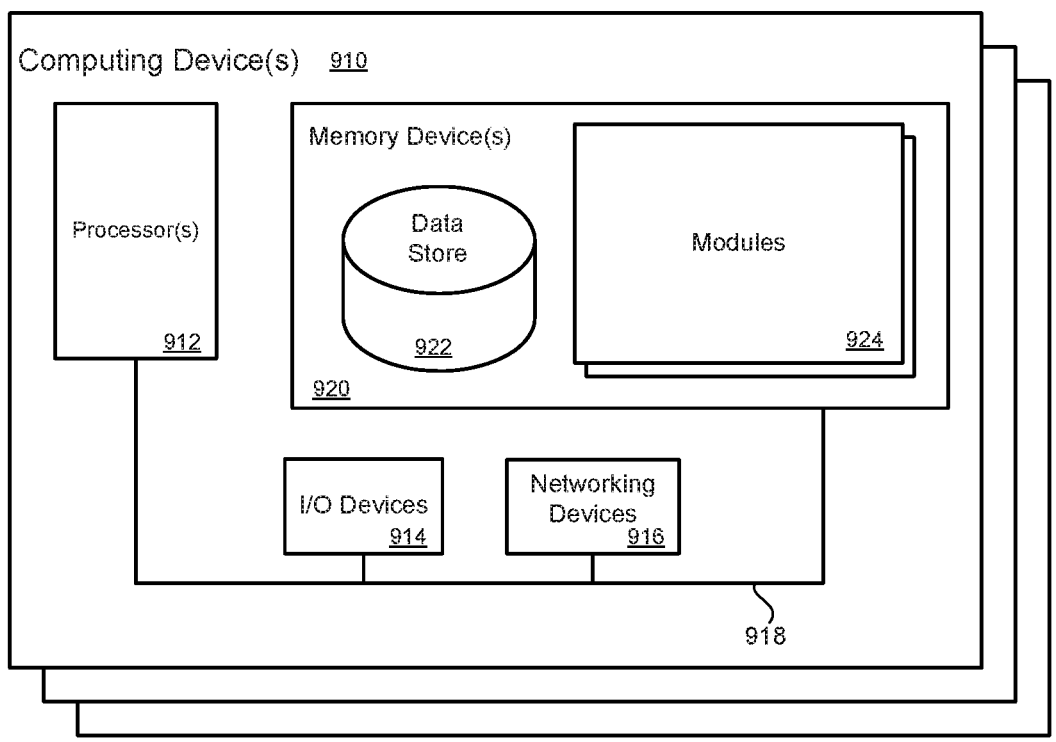
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

Figure 10:
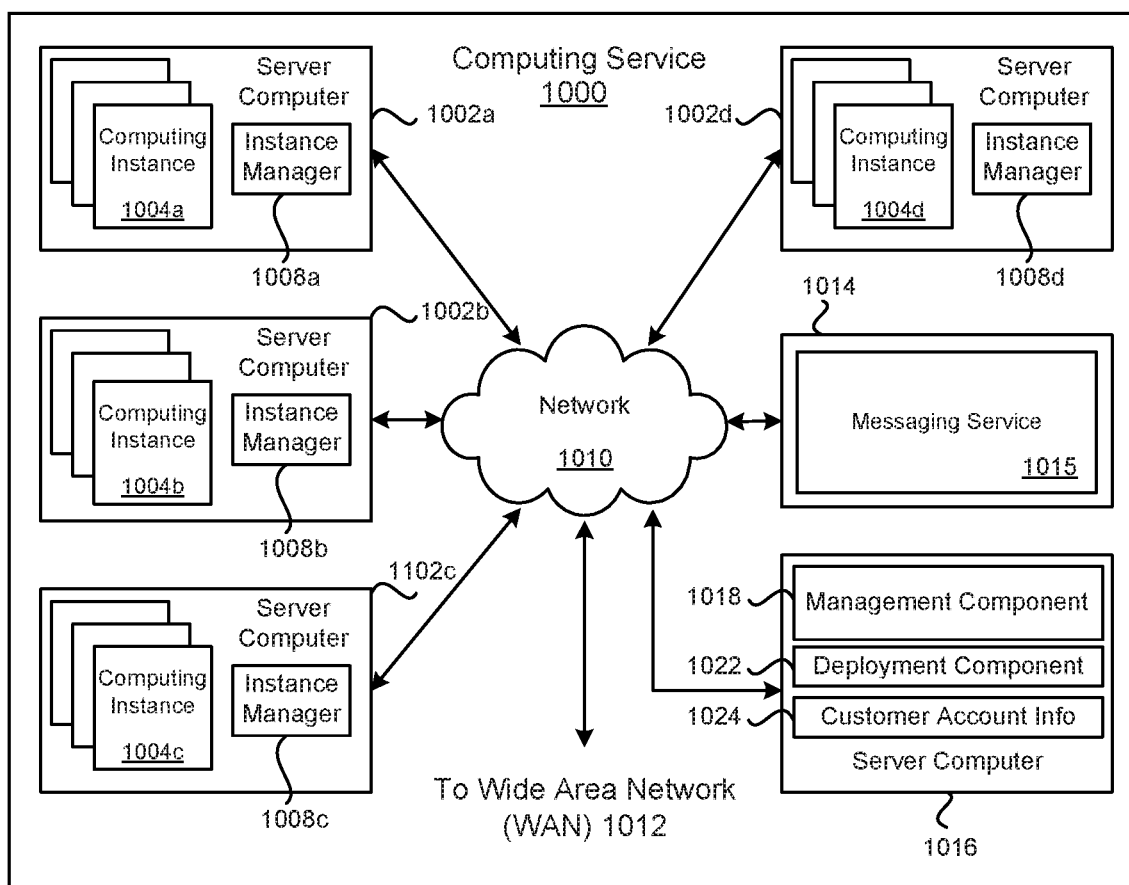
FIG. 10 is a block diagram of a service provider environment according to an example of the present technology.

FIG. 10 is a block diagram illustrating an example computing service 1000 that may be used to execute and manage a number of computing instances 1004*a-d* upon which the present technology may execute. In particular, the computing service 1000 depicted illustrates one environment in which the technology described herein may be used. The computing service 1000 may be one type of environment that includes various virtualized service resources that may be used, for instance, to host computing instances 1004*a-d*.

The computing service 1000 may be capable of delivery of computing, storage and networking capacity as a software service to a community of end recipients. In one example, the computing service 1000 may be established for an organization by or on behalf of the organization. That is, the computing service 1000 may offer a "private cloud environment." In another example, the computing service 1000 may support a multi-tenant environment, wherein a plurality of customers may operate independently (i.e., a public cloud environment). Generally speaking, the computing service 1000 may provide the following models: Infrastructure as a Service ("IaaS"), Platform as a Service ("PaaS"), and/or Software as a Service ("SaaS"). Other models may be provided. For the IaaS model, the computing service 1000 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 1000. End customers may access the computing service 1000 using networked client devices, such as desktop computers, laptops, tablets, smartphones, etc. running web browsers or other lightweight client applications, for example. Those familiar with the art will recognize that the computing service 1000 may be described as a "cloud" environment.

The particularly illustrated computing service 1000 may include a plurality of server computers 1002*a-d*. The server computers 1002*a-d* may also be known as physical hosts. While four server computers are shown, any number may be used, and large data centers may include thousands of server computers. The computing service 1000 may provide computing resources for executing computing instances 1004*a-d*. Computing instances 1004*a-d* may, for example, be virtual machines. A virtual machine may be an instance of a software implementation of a machine (i.e. a computer) that executes applications like a physical machine. In the example of a virtual machine, each of the server computers 1002*a-d* may be configured to execute an instance manager 1008*a-d* capable of executing the instances. The instance manager 1008*a-d* may be a hypervisor, virtual machine manager (VMM), or another type of program configured to enable the execution of multiple computing instances 1004*a-d* on a single server. Additionally, each of the computing instances 1004*a-d* may be configured to execute one or more applications.

A server 1014 may be reserved to execute software components for implementing the present technology or managing the operation of the computing service 1000 and the computing instances 1004*a-d*. For example, the server computer 1014 may execute a messaging service 1015 that maintains a message queue. The messaging service 1015 may detect a plurality of message requests that are sent from application components to the message queue. The messaging service 1015 may identify message attribute information that corresponds to each of the plurality of message requests. The message attribute information may indicate an identity of the application components that are sending the message requests to the message queue. The messaging service 1015 may generate a data stream that includes the plurality of message requests and corresponding message attribute information. The messaging service 1015 may provide the data stream for consumption.

A server computer 1016 may execute a management component 1018. A customer may access the management component 1018 to configure various aspects of the operation of the computing instances 1004*a-d* purchased by a customer. For example, the customer may setup computing instances 1004*a-d* and make changes to the configuration of the computing instances 1004*a-d*.

A deployment component 1022 may be used to assist customers in the deployment of computing instances 1004*a-d*. The deployment component 1022 may have access to account information associated with the computing instances 1004*a-d*, such as the name of an owner of the account, credit card information, country of the owner, etc. The deployment component 1022 may receive a configuration from a customer that includes data describing how computing instances 1004*a-d* may be configured. For example, the configuration may include an operating system, provide one or more applications to be installed in computing instances 1004*a-d*, provide scripts and/or other types of code to be executed for configuring computing instances 1004*a-d*, provide cache logic specifying how an application cache is to be prepared, and other types of information. The deployment component 1022 may utilize the customer-provided configuration and cache logic to configure, prime, and launch computing instances 1004*a-d*. The configuration, cache logic, and other information may be specified by a customer accessing the management component 1018 or by providing this information directly to the deployment component 1022.

Customer account information 1024 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1024 may also include security information used in encryption of asynchronous responses to API requests. By "asynchronous" it is meant that the API response may be made at any time after the initial request and with a different network connection.

A network 1010 may be utilized to interconnect the computing service 1000 and the server computers 1002*a-d*, 1016. The network 1010 may be a local area network (LAN) and may be connected to a Wide Area Network (WAN) 1012 or the Internet, so that end customers may access the computing service 1000. In addition, the network 1010 may include a virtual network overlaid on the physical network to provide communications between the servers 1002*a-d*. The network topology illustrated in FIG. 10 has been simplified, as many more networks and networking devices may be utilized to interconnect the various computing systems disclosed herein.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for generating data streams using message requests to a message queue in a service provider environment, the method comprising:
   detecting, via an agent, a plurality of message requests that are sent from requestors to the message queue, wherein the message queue stores messages for usage by the requestors, and the message queue is operated by a messaging service executing in a service provider environment;
   identifying message attribute information associated with the plurality of message requests, wherein the message attribute information indicates an identity of the requestors sending the message requests to the message queue;
   generating a data stream that includes the plurality of message requests and corresponding message attribute information, wherein the data stream is accessible to an entity over a computer network that has permission to access the data stream;
   determining, based on the message attribute information included in the data stream, that a sub-set of message requests are sent from requestors that are not authorized to send message requests to the message queue;
   sending an alert indicating that the sub-set of message requests are sent from requestors that are not authorized; and
   providing the data stream over the computer network for consumption, wherein the data stream is consumed to enable replication and synchronization of multiple message queues across multiple geographic regions in the service provider environment.

2. The method of claim 1, further comprising:
   selecting types of message requests from the data stream, wherein the types of message requests include requests to send messages to the message queue, requests to receive messages from the message queue and requests to delete messages from the message queue; and
   applying the types of message requests to respective message queues that are replicated across the multiple geographic regions in the service provider environment, thereby synchronizing multiple message queues between the multiple geographic regions of the service provider environment.

3. The method of claim 1, further comprising:
consuming the data stream to enable analytics to be performed on the message queue.

4. A method for generating data output using message requests to a message queue, the method comprising:
detecting a plurality of message requests that are sent to the message queue, wherein the message queue is operated by a messaging service executing in a service provider environment;
identifying message attribute information for the plurality of message requests, wherein the message attribute information includes an identity of requestors sending the plurality of message requests to the message queue;
publishing the plurality of message requests and corresponding message attribute information as a data output;
providing access to the data output over a computer network for consumption of the message attribute information in the data output;
determining, based on the message attribute information included in the data output, that a sub-set of message requests are sent from requestors that are not authorized to send message requests to the message queue; and
sending an alert indicating that the sub-set of message requests are sent from requestors that are not authorized.

5. The method of claim 4, further comprising providing access to the data output to enable analytics to be performed that is related to the message queue.

6. The method of claim 4, further comprising providing access to the data output to enable identification of one or more devices that are sending the plurality of message requests to the message queue, wherein the identification of the one or more devices is utilized to implement intrusion detection for the message queue.

7. The method of claim 4, wherein the message attribute information for each message request includes an Internet Protocol (IP) address of a requestor that sends the message request, a time stamp that corresponds to a sending of the message request, security key information utilized by the requestor that sends the message request, and a message identifier (ID).

8. The method of claim 4, wherein the plurality of message requests include requests to send messages to the message queue, requests to receive messages from the message queue and requests to delete messages from the message queue.

9. The method of claim 4, wherein the message requests are sent to the message queue from application components executing in the service provider environment.

10. The method of claim 4, wherein the message queue is replicated across a plurality of servers in the service provider environment.

11. The method of claim 4, further comprising determining from the data output that a sub-set of message requests are sent from unauthenticated accounts in the service provider environment.

12. The method of claim 4, further comprising determining from the data output that a sub-set of message requests are sent from accounts that are not authorized to send message requests to the message queue.

13. The method of claim 4, further comprising detecting the plurality of message requests and publishing the plurality of message requests to the data output using an agent that operates in the service provider environment.

14. The method of claim 4, further comprising setting a configuration flag in the message queue that enables the message requests being sent to the message queue to be captured for publication in the data output.

15. The method of claim 4, further comprising:
performing analytics using the data output that includes the message requests and corresponding message attribute information; and
generating an alert when the data output triggers a flag based on rules.

16. The method of claim 4, wherein the data output enables the message requests indicated in the data output to be propagated to message queues replicated across multiple geographic regions in the service provider environment, thereby synchronizing multiple message queues.

17. A system for generating data streams using message requests to a message queue, the system comprising:
a processor;
a memory device including a data store to store a plurality of data and instructions that, when executed by the processor, cause the system to:
detect a plurality of message requests that are sent to the message queue, wherein the message queue is operated by a messaging service executing in a service provider environment;
identify message attribute information that corresponds to each of the plurality of message requests, wherein the message attribute information includes an identity of requestors sending the plurality of message requests to the message queue;
generate a data stream that includes the plurality of message requests and corresponding message attribute information;
determine, based on the message attribute information included in the data stream, that a sub-set of message requests are sent from requestors that are not authorized to send message requests to the message queue; and
send an alert indicating that the sub-set of message requests are sent from requestors that are not authorized.

18. The system of claim 17, wherein the plurality of data and instructions, when executed by the processor, cause the system to:
select predefined types of message requests from the data stream; and
perform the predefined message requests with respective message queues that are replicated across multiple geographic regions in the service provider environment.

19. The system of claim 17, wherein the plurality of data and instructions, when executed by the processor, cause the system to:
perform analytics on the data stream, wherein the analytics is performed on an aggregate view of the plurality of message requests sent to the message queue; and
determine based on the analytics of the data stream that a sub-set of message requests are sent from accounts that are not authorized to send message requests to the message queue.

20. The system of claim 17, wherein:
the message requests include requests to send messages to the message queue, requests to receive messages from the message queue and requests to delete messages from the message queue; and
the message attribute information for each message request includes an Internet Protocol (IP) address of a requestor that sends the message request, a time stamp that corresponds to a sending of the message request, security key information utilized by the requestor that sends the message request, and a message identifier (ID).

* * * * *